(12) United States Patent
Inglis

(10) Patent No.: US 6,856,975 B1
(45) Date of Patent: Feb. 15, 2005

(54) SYSTEM, METHOD, AND ARTICLE OF MANUFACTURE FOR SECURE TRANSACTIONS UTILIZING A COMPUTER NETWORK

(75) Inventor: Frank Inglis, Phoenix, AZ (US)

(73) Assignee: Verify & Protect Inc., Lisle, IL (US)

( * ) Notice: Subject to any disclaimer, the term of this patent is extended or adjusted under 35 U.S.C. 154(b) by 0 days.

(21) Appl. No.: 09/540,193

(22) Filed: Mar. 30, 2000

(51) Int. Cl.[7] ............................................. G06F 17/00
(52) U.S. Cl. .............................. 705/51; 705/1; 705/40; 705/54
(58) Field of Search ................................ 705/51, 54, 1

(56) References Cited

PUBLICATIONS

Spring, E–Business Security Technologies, 2001.*

* cited by examiner

Primary Examiner—Richard Weisberger
(74) Attorney, Agent, or Firm—The Halvorson Law Firm

(57) ABSTRACT

The present invention is a system or method and device useful for the secure electronic payment of consumer debts over a publicly accessible computer network. The preferred form of the present invention uses at least two separate, but compatible, software packages. Security server software that continuously runs on a security server and payor software that runs on demand on a payor computer system. The payor computer system communicates via the payor software with the security server via the security server software. The communication, or transaction, session operates under the secure communication protocol described below. A payee computer system may also communicate via payee software with the security server. Additionally, a version is provided that utilizes smart card technology and a remote kiosk computer that communicates with the security server.

10 Claims, 6 Drawing Sheets

SYSTEM, METHOD, AND ARTICLE OF MANUFACTURE FOR SECURE TRANSACTIONS UTILIZING A COMPUTER NETWORK

FIELD OF THE INVENTION

The present invention relates to the secure, electronic payment of consumer debt over a communication network, and more specifically, to a system, method and article of manufacture for securely transmitting payment information from a payor to a security server, which processes the transaction, and returning a confirmation of said payment.

BACKGROUND

The present invention relates to a method, device utilizing an electronic graphical representation of a monetary system for implementing electronic money payments as an alternative medium of economic exchange to cash, checks, credit and debit cards, and traditional electronic funds transfer. The system according to the present invention utilizes electronic representations of money that are designed to be universally accepted and exchanged as economic value by subscribers of the monetary system.

Currently, approximately 350 billion monetary transactions occur between individuals and institutions annually. The extensive use of monetary transactions has limited the automation of individual transactions such as purchases, fares, and bank account deposits and withdrawals. Individual cash transactions are burdened by the need to have the correct amount of cash or providing change therefor. Furthermore, the handling and managing of paper cash and coins is inconvenient, costly, and time consuming for both individuals and financial institutions.

Although checks may be written for any specific amount up to the amount available in the account, checks have very limited transferability and must be supplied from a physical inventory. Paper-based checking systems do not offer sufficient relief from the limitations of cash transactions, sharing many of the inconveniences of handling currency while adding the inherent delays associated with processing checks. To this end, economic exchange is moving toward automation for greater convenience at a lower cost.

Automation is being used for large transactions through computerized electronic funds transfer ("EFT") systems. ETF is essentially a process of value exchange achieved through the banking system's centralized computer transactions. EFT services are a transfer of payments utilizing electronic "letters of credit" and are used primarily by large commercial organizations. The American Clearing House (ACH), where a user can enter a pre-authorized code and download information with billing occurring later, and Point Of Sale (POS) systems, where transactions are processed by connecting with a central computer for authorization for the transaction granted or denied immediately, are examples of EFT systems that are utilized by retail and commercial organizations.

Home banking bill payment services are another example of EFT systems used by individuals to make payments from a home computer. Currently, however, home banking initiatives have found few payors. Less than one percent of bank payors use service accounts for transfers and information, using personal computers over telephone lines. One reason that home banking has not been a successful product is because the payor cannot deposit and withdraw money as needed in this type of system. Another reason home banking initiatives have found few payors is the inherent distrust in the security of data transmission of financial data across the Internet 100 prevalent in society given the present Internet 100 security and encryption products currently available to the general public.

Current EFT systems, credit cards, or debit cards, which are used in conjunction with an online system to transfer money between accounts, such as between the account of a merchant and that of a payor, do not satisfy the need for an automated transaction system providing an ergonomic interface.

To implement an automated, convenient transaction that can dispense some form of economic value, there has been a trend towards off-line payments. For example, numerous ideas have been proposed for some form of "electronic money" that can be used in non-cash payment transactions as alternatives to the traditional currency and check types of payment systems. Best known of these are magnetic stripe cards purchased for a given amount and from which a prepaid value can be deducted for specific purposes. Upon exhaustion of the economic value, the cards may be thrown away. Other examples include memory cards or so called smart cards, which are capable of repetitively storing information representing value that is likewise deducted for specific purposes. These methods also do not satisfy the current needs for a consumer friendly, convenient and secure electronic transaction system.

The Internet has become a valuable tool for the electronic transfer of information, which can include financial transactions. It is possible and desirable for a computer operating under the control of the payor over a publicly accessible packet-switched network (e.g., the Internet) to bi-directionally share payment information with a computer operated under the control of a payee, without risking the exposure of the information to interception by third parties that have access to the network, and to assure that the information is from an authentic source. It is further desirable for this information, including a subset of the information provided by the payor, to be provided to the payee by the security server system that is designated by a bank or other financial institution that has the responsibility of providing payment on behalf of the payor, without the risk of exposing that information to interception by third parties. Such institutions may include, for example, merchants or financial institutions.

One such attempt to provide such a secure transmission channel is a secure payment technology such as Secure Electronic Transaction (hereinafter "SET"), jointly developed by the Visa and MasterCard card associations, and described in Visa and MasterCard's Secure Electronic Transaction (SET) Specification, Feb. 23, 1996, hereby incorporated by reference. Other such secure payment technologies include Secure Transaction Technology ("STT"), Secure Electronic Payments Protocol ("SEPP"), Internet Keyed Payments ("IKP"), Net Trust, and Cybercash Credit Payment Protocol. One of ordinary skill in the art readily comprehends that any of the secure payment technologies can be substituted for the SET protocol without undue experimentation.

Such secure payment technologies, referenced above, require the payor to operate software that is compliant with the secure payment technology, interacting with third-party certification authorities, thereby allowing the payor to transmit encoded information to a payee, some of which may be decoded by the payee, and some which can be decoded only by an institution specified by the payor.

Another such attempt to provide such a secure transmission channel is a general-purpose secure communication protocol such the Secure Sockets Layer (hereinafter "SSL"). SSL provides a means for secure transmission between two computers. SSL has the advantage that it does not require special-purpose software to be installed on the payor's computer because it is already incorporated into widely available software that many people utilize as their standard Internet access medium. Other examples of general-purpose secure communication protocols include Private Communications Technology ("PCT") from Microsoft, Inc.; Secure Hyper-Text Transport Protocol ("SHTTP") from Terisa Systems; Shen; Kerberos; Photuris; and Pretty Good Privacy ("PGP") all of which meet the IPSEC criteria. One of ordinary skill in the art readily comprehends that any of the general-purpose secure communication protocols can be substituted for the SSL transmission protocol without undue experimentation. However these protocols have proven to be vulnerable to attack, therefore greater security must be available.

Banks desire an Internet payment solution that functions similar to existing Point of Sale (POS) applications that are currently installed on their host computers and require minimal changes to their host systems. This is a critical requirement since any downtime for a bank's host computer system represents an enormous expense. Currently, there are over fourteen hundred different payment-related applications available. The large number of applications is necessary to accommodate a wide variety of host message formats, diverse methods for communicating to a variety of hosts with different dial-up and direct-connect schemes, and different certification around the world.

Internet-based payment solutions require additional security measures that are not found in conventional POS or EFT terminals. This additional requirement is necessitated because Internet communication is done over publicly accessible unsecured communication line in stark contrast to the private, secure, dedicated phone or leased line service utilized between a traditional payee and an acquiring bank. Thus, it is critical that any solution utilizing the Internet for a communication backbone employs some form of secure cryptography.

As discussed above, the current state-of-the-art in Internet based payment processing is a protocol referred to as SET, or Secure Electronic Transaction. Since the SET messages are uniform across all implementations, banks cannot differentiate themselves in any reasonable way. Also, since SET is not a proper superset of all protocols utilized today, there are bank protocols that cannot be mapped or translated into SET because they require data elements for which SET has no placeholder. Further, SET only handles the message types directly related to authorizing and capturing credit card transactions and adjustments to these authorizations or captures. In a typical EFT terminal in the physical world, these messages comprise almost the entire volume of the total number of messages between the payee and the authorizing bank, but only half of the total number of different message types. These message types, which are used infrequently, but which are critical to the operation of the EFT terminal must be supported for proper transaction processing.

Generally, applications written for this field are written using JAVA, C, and/or the C++ languages and utilize object oriented programming methodology. Object oriented programming (OOP) has become increasingly used to develop complex applications. As OOP moves toward the mainstream of software design and development, various software solutions require adaptation to make use of the benefits of OOP.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules that present an interface that conforms to an object model and that are accessed at run-time through component integration architecture. Component integration architecture is a set of architecture mechanisms that allow software modules in different process spaces to utilize each other's capabilities or functions. This is generally done by assuming a common component object model on which to build the architecture.

It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends on" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, our logical perception of the reality is the only limit on determining the kinds of things that can become objects in object-oriented software. Some typical categories are illustrated as follows: objects can represent physical objects, such as automobiles in a traffic-flow simulation, electrical components in a circuit-design program, financial transactions in an economics model, or aircraft in an air-traffic-control system; objects can represent elements of the computer-user environment such as windows, menus or graphics objects; an object can represent an inventory, such as a personnel file or a table of the latitudes and longitudes of cities; or an object can represent user-defined data types such as time, angles, and complex numbers, or points on the plane.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, common lisp object system (CLOS), and Eiffel. Additionally, OOP capabilities are being added to more traditional popular computer programming languages such as Pascal.

The development of graphical user interfaces began to turn procedural programming arrangements inside out. These interfaces allow the user, rather than program logic, to drive the program and decide when certain actions should be performed. Today, most personal computer software accomplishes this by means of an event loop that monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries or objects provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes of objects that make up a reusable design solution for a given problem domain. It typically includes objects that provide default behavior (e.g., for menus and windows), and programmers use it by inheriting some of that default behavior and overriding other behavior so that the framework calls application code at the appropriate times. There are three main differences between frameworks and class libraries:

Behavior versus Protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus Override. With a class library, the programmer codes objects and calls their member functions. It's possible to code and call objects in the same way with a framework (i.e., s to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus Design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved.

To date, Web development tools have been limited in their ability to create dynamic Web applications that span from client to server and inter-operate with existing computing resources. Until recently, HTML has been the dominant technology used in development of Web-based solutions. However, HTML has proven to be inadequate in the following areas: poor performance; restricted user interface capabilities; lack of interoperability with existing applications and data; inability to scale, and weak security.

Sun Microsystem's Java language solves many problems by: improving performance; enabling the creation of dynamic, real-time web applications; and providing the ability to create a wide variety of user interface components.

With Java, developers can create robust User Interface (UI) components. Custom "widgets" (e.g. real-time stock tickers, animated icons, etc.) can be created, and performance is improved. Unlike HTML, Java supports the notion of validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "A simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g. simple animations, page adornments, basic games, etc.). Applets execute within a Java-compatible browser (e.g. Netscape Navigator or Internet Explorer) by copying code from the server to client. From a language standpoint, Java's core feature set is based on C++. Sun's Java literature states that Java is basically "C++, with extensions from Objective C for more dynamic method resolution".

Another technology that provides similar function to JAVA is provided by Microsoft and ActiveX Technologies, to give developers and Web designers the wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and Microsoft's development tool 10 for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

SUMMARY OF THE INVENTION

According to a broad aspect of a preferred embodiment of the invention, secure transmission of data is provided between at least two computer systems over a public communication system, such as the Internet. Secure transmission of data is provided from the payor computer system to a banking computer system, which may initiate further secure transmission of payment information regarding a payment instrument from the banking computer system to a the payee computer system. The payment system formats transaction information appropriately and transmits the transaction to the particular host system. The host system evaluates the payment information and returns a level of authorization of credit transfer to the payee computer.

The novel features that are considered characteristic of the invention are set forth with particularity in the appended claims. The invention itself, however, both as to its structure and its operation together with the additional object and advantages thereof will best be understood from the following description of the preferred embodiment of the present invention when read in conjunction with the accompanying drawings. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Description of Preferred Embodiments is not intended to indicate a desire to invoke the special provision of 35 U.S.C. §112, paragraph 6 to define the invention. To the contrary, if the provisions of 35 U.S.C. §112, paragraph 6, are sought to be invoked to define the invention(s), the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means of step, then the intention is not to invoke the provisions of 35 U.S.C. §112, paragraph 6. Moreover, even if the provisions of 35 U.S.C. §112, paragraph 6, are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

DESCRIPTION OF THE DRAWINGS

The foregoing and other objects, aspects and advantages are better understood from the following detailed description of a preferred embodiment of the invention with reference to the drawings, in which.

DETAILED DESCRIPTION

The present invention is a system or method and device useful for the secure electronic payment of consumer debts over a publicly accessible computer network.

Figure 1:
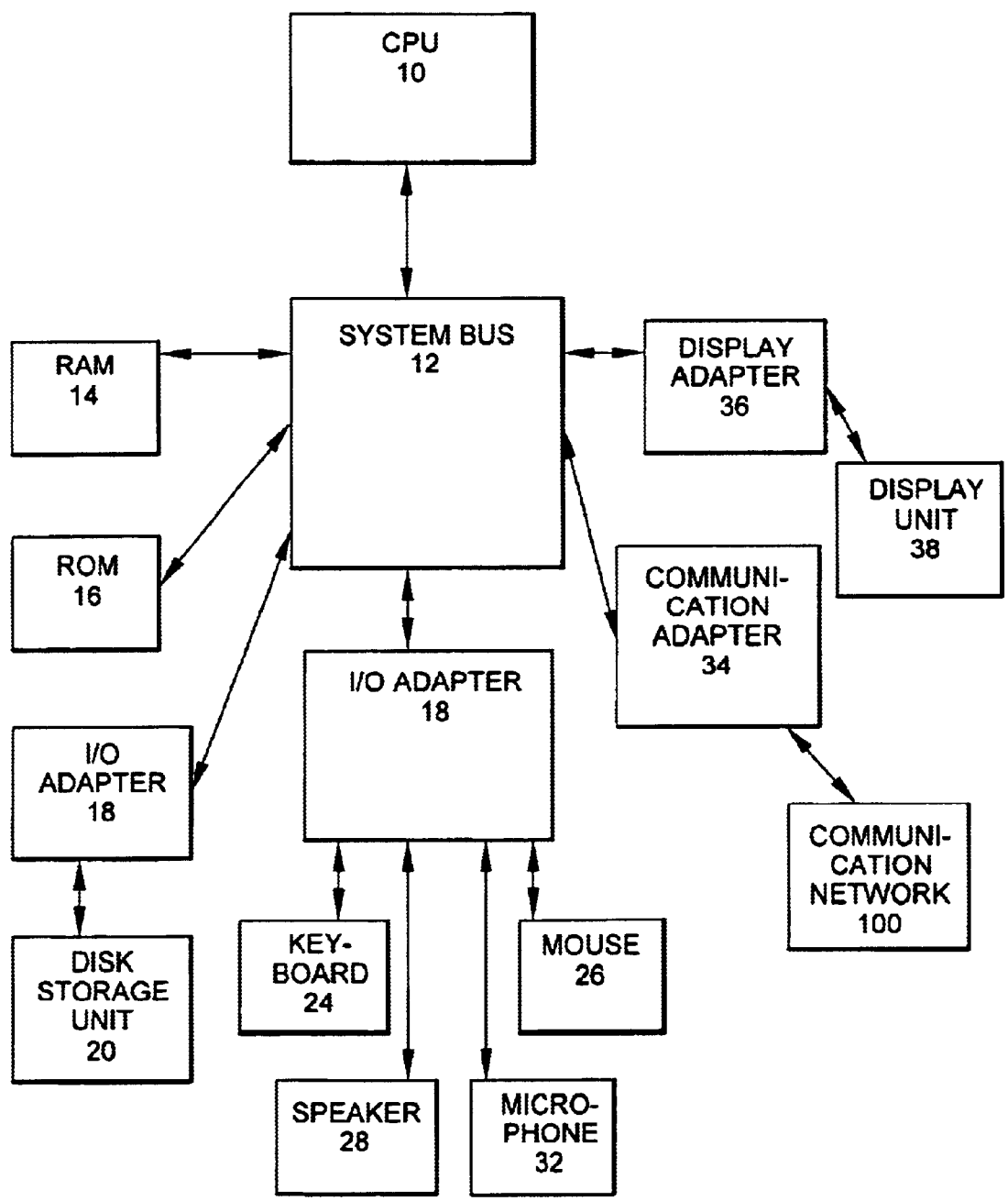
FIG. 1 is a block diagram of a representative hardware environment in accordance with a preferred embodiment.
Figure 2:
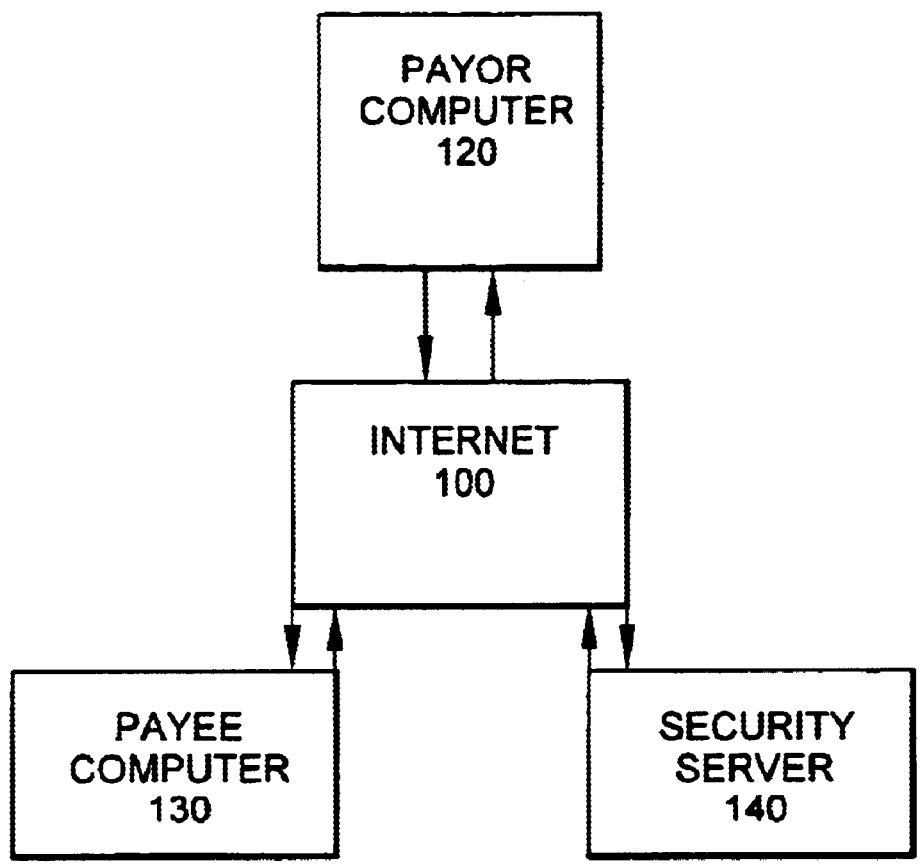
FIG. 2 depicts an overview in accordance with a preferred embodiment.

A preferred embodiment of a system in accordance with the present invention is practiced in the context of personal computers or workstations. A representative hardware environment is depicted in FIG. 1, which illustrates a typical hardware configuration of a computer workstation in accordance with a preferred embodiment having a central processing unit 10, such as a microprocessor, and a number of other units interconnected via a system bus 12. The workstation shown in FIG. 1 includes Random Access Memory (RAM) 14, Read Only Memory (ROM) 16, an I/O adapter 18 for connecting peripheral devices, such as disk storage units 20 to the bus 12, a user interface adapter 22 for connecting a keyboard 24, a mouse 26, a speaker 28, a microphone 32, and/or other user interface devices, such as a touch screen or and the like (not shown) to the bus 12, communication adapter 34 for connecting the workstation to a communication network 100 (e.g., a data processing network) and a display adapter 36 for connecting the bus 12 to a display device 38. The workstation typically has resident thereon an operating system such as the Microsoft Windows NT or Windows/95 Operating System (OS), the IBM OS/2 operating system, the MAC OS, or UNIX operating system. Those skilled in the art will appreciate that the present invention may also be implemented on platforms and operating systems other than those mentioned.

The preferred embodiment of the invention utilizes a variety of different software languages, (preferably CC++ and JAVA but may include such languages as HyperText Markup Language (HTML) and Extended Markup Language (XML)), to implement objects and documents on the Internet 100 together with a general-purpose secure communication protocol for a transport medium between the client and the payee.

Figure 3A:
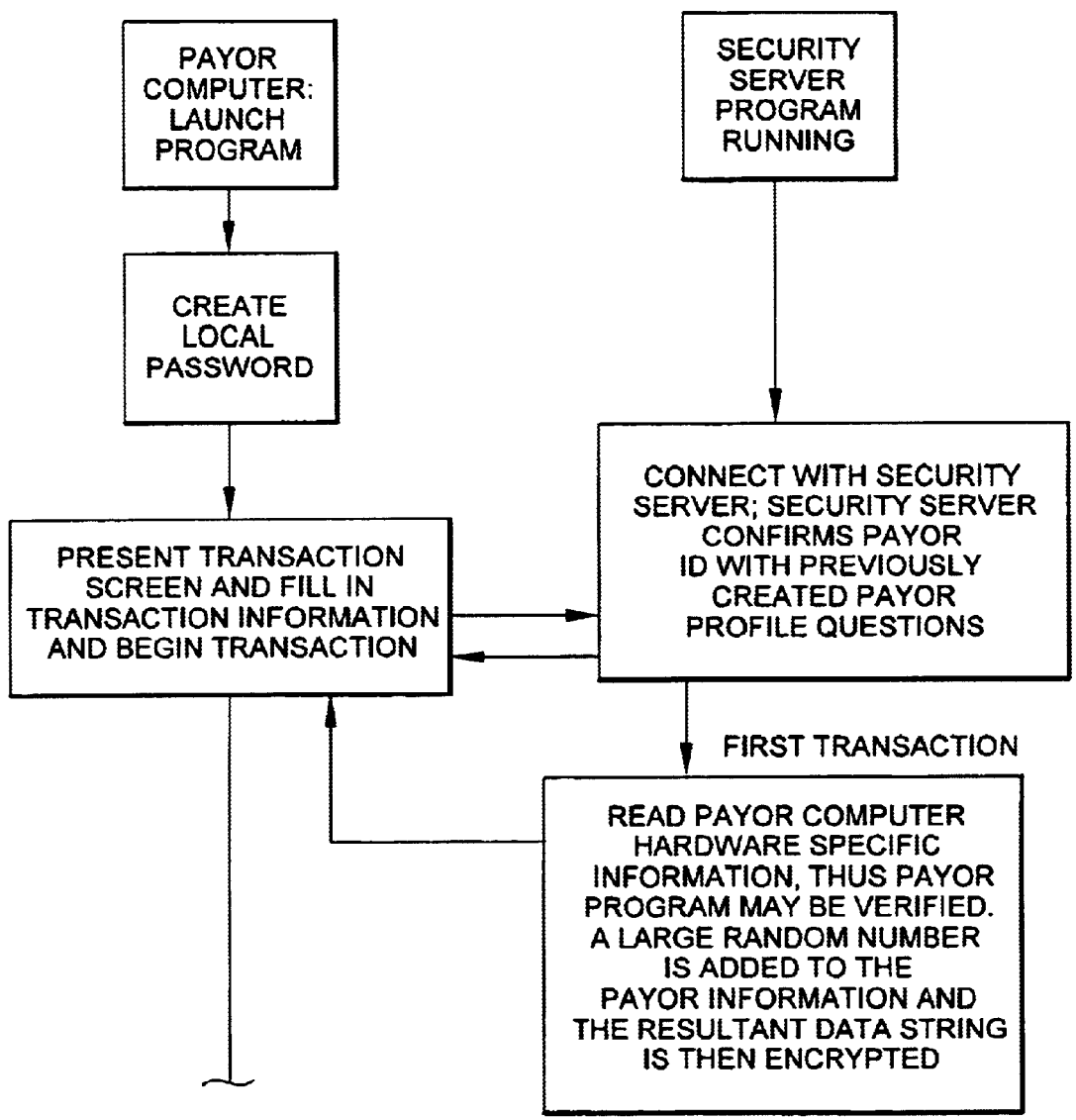
FIG. 3 is a block diagram of the system in accordance with a preferred embodiment.
Figure 3B:
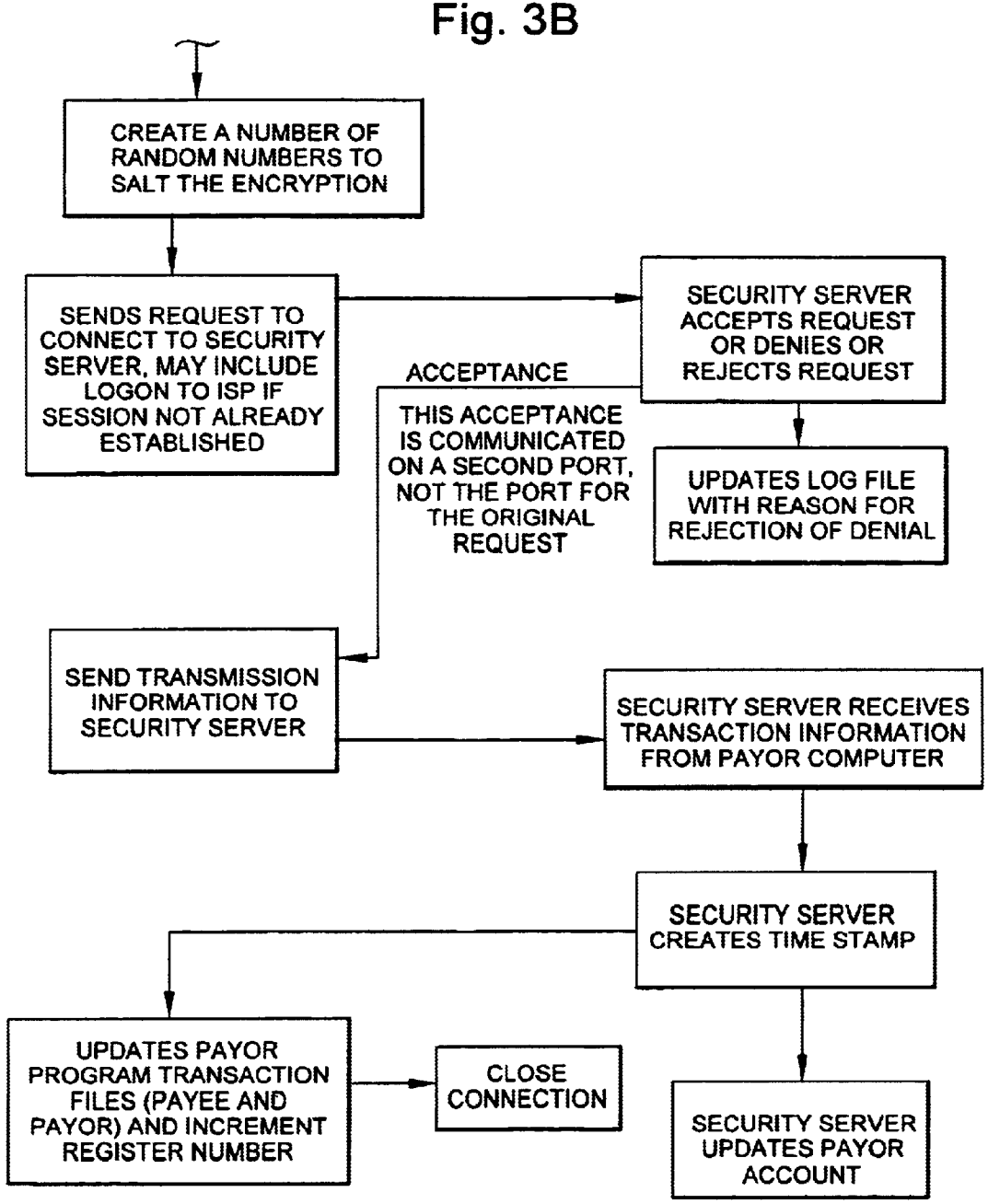

FIG. 3 depicts an overview of the present invention. The preferred form of the present invention uses at least two separate, but compatible, software packages. Security server software that continuously runs on a security server 140 and payor software that runs on demand on a payor computer system 120. The payor computer system 120 communicates via the payor software with the security server 140 via the security server software. The communication, or transaction, session operates under the secure communication protocol described below. A payee computer system 130 may also communicate via payee software with the security server 140.

A security server 140 is a computer system that provides electronic commerce services in support of a bank or other financial institution, and that interfaces to the financial institution to support the authorization and capture of transactions. The transaction session between the payor computer system 120 and the security server 140 operates under a variant of a secure payment technology, as described herein, referred to as Payor-Originated Secure Electronic Transactions ("POSET"), as is more fully described herein.

Initially, the payor creates a one-time payor profile at the receiving institution, such as a bank. The payor profile preferably includes a user pass phrase and user created personal verification questions, which are used for future verification of payor identity. The verification questions are randomly created by the payor and may be questions such as mother's maiden name, favorite color or the like. Preferably the pass phrase is not limited to a short contiguous number and/or letter combination, like an ordinary pin or password, but can include blank or white spaces between characters or words. The use of a longer phrase helps to prevent a "dictionary attack" on the pass phrase. The benefit to the use of a phrase with white spaces is the increased ease with which the payor can remember a more complicated pass phrase, thereby increasing security. The payor profile information is encrypted and made resident on the security server 140. The encryption of the payor profile information adds a level of security against unauthorized access by institution or bank personnel.

Generally, a security server program is resident and continuously running on the security server 140. This allows the security server program to be accessed at any time by a payor. The payor launches the payor software program on the payor computer system 120. Upon the first launch of the payor program, the payor program executes an initialization, or registration procedure. In this procedure, the payor computer program requires the payor to create and enter a customer, or access, password. This password is used on each subsequent launch of the payor program to verify and identify the payor and account or accounts being accessed. A user transaction screen, such as a "check screen" is then presented to the payor. In the transaction screen are transaction fields that the payor fills in and sends to the security server program. Once a transaction has been initialized, the payor computer program then attempts to contact the security server 140 over a computer network system, commonly known as the Internet 100.

During the first session, after communications have been established between the security server 140 and the payor computer system 120, in one embodiment the security server program obtains hardware specific information from the payor computer system 120. Since hardware specific information is individual to each computer, it acts as a "finger print" that can be used to uniquely identify the computer program. Additionally, this allows easy verification and identification of the specific computer program during future transactions. The hardware specific information is encrypted and stored with the payor profile information in the security server database or on both computers to account for subsequent changes in the hardware configuration, i.e., new hard drives and the like. By combining use of the customer password, the payor computer hardware information, and payor profile information, both the payor and the payor's program may be quickly, easily, and securely verified during future transactions.

When initiating communication with the security server system 140, the payor computer system 120 may use any well-known access protocol, e.g., Transmission Control Protocol/Internet Protocol ("TCP/IP"). A description of TCP/IP is provided in Information Sciences Institute, "Transmission Control Protocol DARPA Internet Program Protocol Specification (RFC 793)" (September 1981), and Information Sciences Institute, "Internet Protocol DARPA Internet Program Protocol Specification (RFC 791)" (September 1981). In this implementation, the payor computer system 120 acts as a client and the security server system 140 acts as a server.

When initiating communication with the security server 140, the payor computer system 120 first sends a "client request for connection" message to the security server system 140. The client request for connection message may further include a variable length session identifier.

In response to the client request for connection message, if the security server system 140 wishes to correspond with the payor computer system 120, it responds with a message to the payor computer system 120 to switch to a second, separate transaction port, thereby creating a second, or transaction, session. An alternate way to consider this is as a single session that is conducted over two separate pathways: 1) over a first initial communications port; and 2) over a second transaction port. This is an important part of the present invention in that the identity of the second port is dynamically assigned and changes for each and every independently created session. This creates an extra element of variability to the transaction process that improves to the security of the transaction. If the security server system 140 does not wish to communicate with the payor computer system 120, it responds with a message indicating refusal to communicate.

Figure 4A:
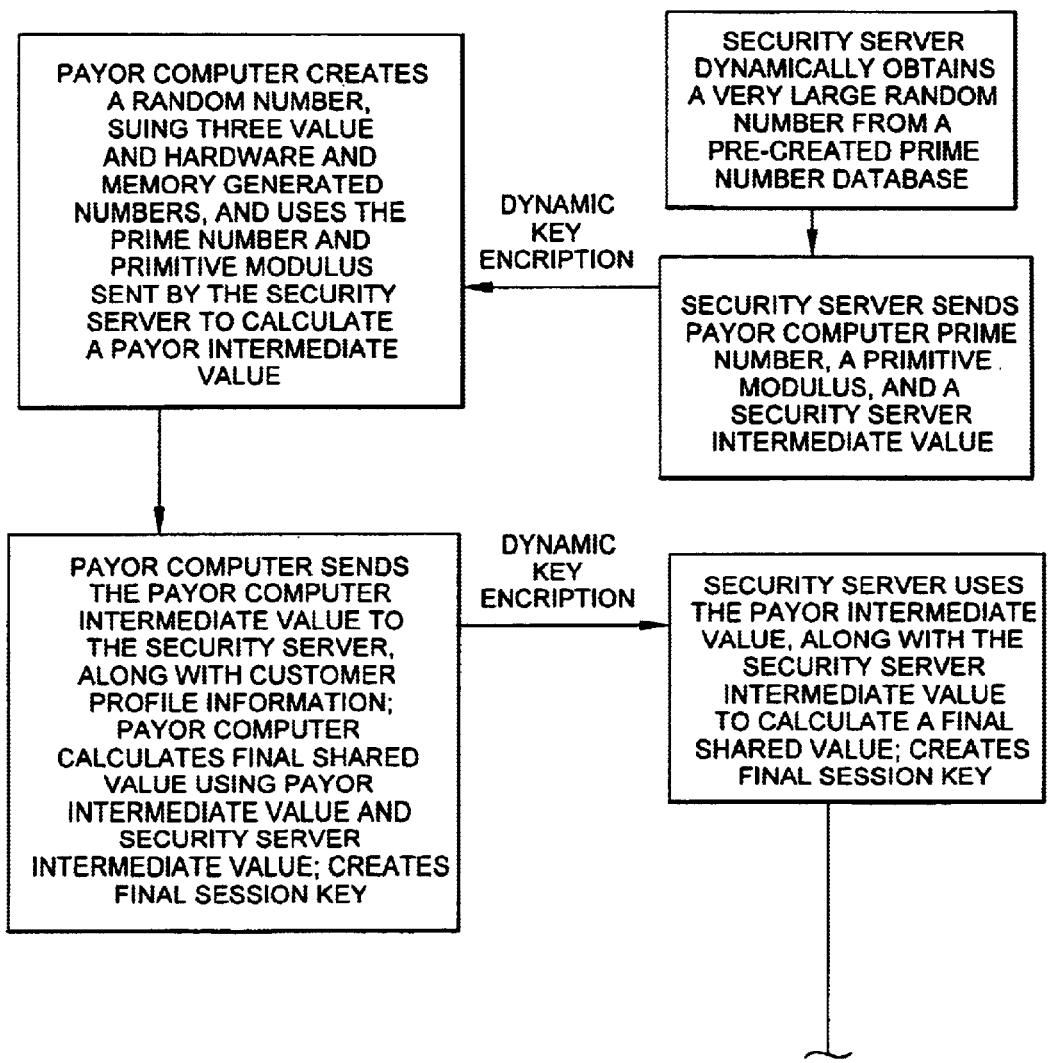
FIG. 4 depicts a preferred embodiment of an acceptance method according to the present invention.
Figure 4B:
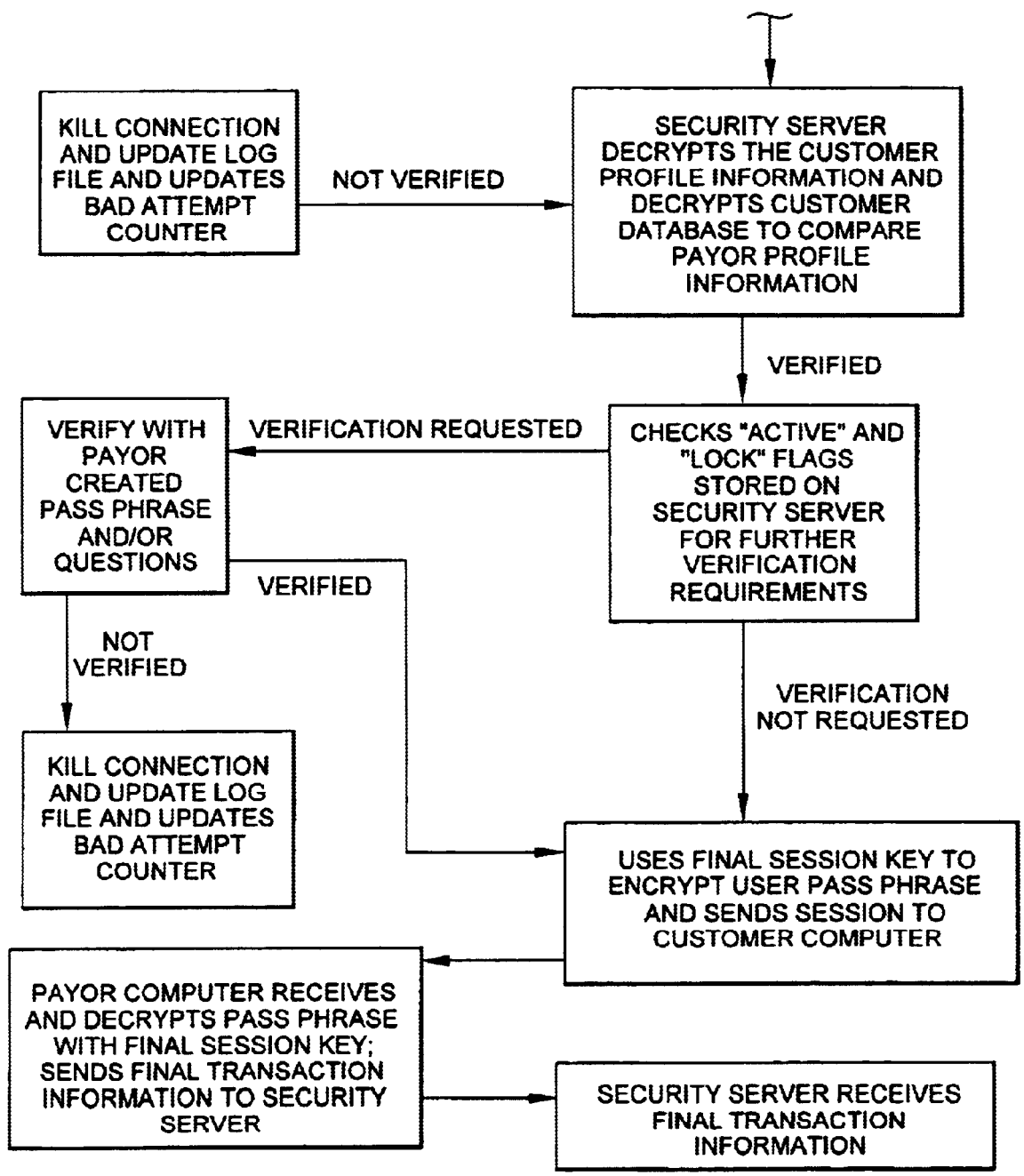

FIG. 4 depicts the detailed steps of authorizing communications between the payor computer 120 and the security server 140, including the generating and transmitting of a payment authorization request.

Preferably, the security server connection message includes an initial very large prime number, a prime modulus, and a server calculated intermediate value. The payor computer system 120 replies to the security server connection message with a client response message that preferably includes a payor calculated intermediate value. Separately, the payor computer system 120 calculates a final shared value. Once the security server 140 receives the payor calculated intermediate value, it too calculates the final shared value.

More specifically, the security server system 140 obtains a randomly generated server secret number. The security server 140 also selects a very large public prime number, which is preferably, a very large prime number residing in a pre-created prime number database, and a prime modulus. The security server 140 creates a server calculated intermediate value using the secret random number, the public prime number, and the prime modulus, by performing a portion of a selected algorithm. The security server 140 sends the server calculated intermediate value, the public prime number, and the prime modulus to the payor computer system 120. The payor computer system 120 generates a payor secret random number and uses the public prime number and prime modulus to create a payor calculated intermediate value. Additionally, the payor computer system 120 uses the server calculated intermediate value and the payor calculated intermediate value to calculate a shared final value. The payor computer system 120 sends the payor calculated intermediate value, along with selected payor ID or profile information to the security server 140. In a preferred embodiment, the calculated intermediate values are encrypted before transmission. The security server 140 uses the payor calculated intermediate value, with the security server calculated intermediate value, to also calculate the same shared final value. Thus, the shared final value, which while known by both computers, is never transmitted. For this very reason, the shared final value cannot be intercepted by a third party for use in a fraudulent attempt on the account.

While other like algorithms with similar properties may be used, a preferred algorithm for the above security process is as follows:

SIV (security server intermediate value)=$g^{SRN}$ mod p, where g is the public prime number, mod p is the prime modulus, and SRN is the security server random number, CIV (payor intermediate value)=$g^{CRN}$ mod p, where g is the public prime number, mod p is the prime modulus, and CRN is the payor random number; and SFV (shared final value)=$SIV^{CRN}$ mod p, for the payor computer 120, and =$CIV^{SRN}$ mod p, for the security server 140.

In creating the payor random number, a preferred embodiment has the payor computer system 120 using random values to seed the creation of a unique large random number. Preferably, these random numbers are obtained dynamically within the session, and even more preferably, are obtained from unique non-repeatable functions, such as mouse or cursor positions.

In each separate system, the payor computer system 120 and the security server 140, the shared final value, in combination with selected portions of the payor profile information, is encrypted using yet another function, such as a one-way secure hash algorithm, to produce a final session key. This final session key, having portions that are generated dynamically within each session, and portions that are personal to each individual payor, is computationally impossible to decode or generate in the time allotted for each transaction, thereby providing an exceptionally high level of security for each transaction. The inclusion of a one-way function encryption of the data provides an ultra-high level of security for each transaction.

The security server 140 then takes the payor's ID information and compares to the payor profile information resident in the security server 140 in order to verify the payor. If the payor ID information is not verified, the connection is immediately terminated and logged to a failure database.

If the payor profile information is verified during the transaction, the security server 140 proceeds to check several flags, or indicia fields, for an indication of whether further verification or encryption, such as by providing the answers to the private questions previously supplied, is required.

At this point both the payor computer system 120 and the security server system 140 have: 1) negotiated a communication session; 2) have communicated to each other the basis for the calculation of a set of encryption keys that may be used to encrypt and decrypt further communications between the two computer systems, 120 and 140 respectively; and 3) have calculated a final session key that is never transmitted and will be used for further encryption. The payor computer system 120 and the security server system 140 may thereafter engage in a secure financial transaction with a greatly reduced risk of interception or fraud by third parties.

After a connection has been authorized and implemented, the security server 140 checks the present account register number of the payor program. Initially, the current account register number is set to a zero transaction number. At any time, including immediately after registration of the program but before a first transaction has been processed, the payor may simply elect to exit the payor computer program and reenter it at another time. If the payor does not exit the payor program, a graphical user program interface, as discussed above, preferably the "check" screen, is generated on the payor computer 120. The program interface includes enterable fields for transaction specific information.

If additional encryption is requested, the security server 140 may request portions of transaction information previously sent or it may encrypt a verifying value. If the verifying value is sent to the payor computer system 120, the payor computer system 120 decrypts the verifying value and uses it in one of two different ways. First, it may be used as additional data added to the transaction information, re-encrypted and sent to the security server. Then, when the security server 140 decrypts the transaction it compares the verifying value before processing the transaction. Second, the decrypted verifying value may be used as an initial value to roll-over encrypt the transaction information, which is then further encrypted using the final session key and sent to the security server 140. The security server 140 then decrypts the message, and decrypts the roll-over encrypted transaction (using the verifying value). If the both systems use the same verifying value, the security server then has transaction information that is appropriate for the system, otherwise the decryption of the rolled-over information will yield strange characters and/or information. These two methods are typically selected by the software and may be dynamically chosen such that any individual transaction may use one or the other method.

Once the transaction has been verified and processed, the security server 140 creates a time stamp, encrypts it, and sends it to the payor computer system 120 to finalize the transaction. In this way, the payor, not being in control of the time stamp, cannot create a false time record. Once the payor program receives the time stamp, it then increments the account register number counter of the payor program by one and fills in the check information.

Among the information communicated by the payor computer system 120 to the security server system 140 may be information that specify payment information, such as payee identification, bank identification, bank account numbers, credit card numbers, and related information, collectively referred to as "payment information," that may be used to pay the bill for the goods and/or services ordered. In order to obtain payment, the payee may supply a portion of this information to the bank or other institution responsible for the proffered payment method. This enables the payee to perform payment authorization and payment capture. Payment authorization is the process by which permission is granted to a security server 140 operating on behalf of a financial institution to authorize payment on behalf of the financial institution. This is a process that assesses transaction risk, confirms that a given transaction does not raise the account holder's debt above the account's balance. Payment capture is the process that triggers the movement of funds from the financial institution to the payee's account in order to settle the account.

The security server system 140 identifies the payee for which the transaction is authorized by inspection of the transaction information. The security server system 140 may contact the appropriate payee using a secure means, preferably via the Internet, and using prior art means, obtains a response indicating whether the requested payment is due, presented, and has been confirmed.

In contacting the payee, the security server may utilize one of two different methods. A first method is used for non-institutional payee's, such as private individuals or small businesses. In this method, the security server program automatically generates an electronic mail message (e-mail) that identifies the payor and the fact that a payment has been made. It is preferable that the e-mail message does not indicate the amount of payment or account to which the payment was made for security purposes. A second method, which is preferably used for larger payee's such as large business and institutions is the use of a payee program on a payee computer system 130. The payee program communicates with the security server program, as detailed below, and may provide, among other information, the name of the payor, the invoice number or customer number, the amount of payment, the account to which the payment has been made, and the like. The transaction between the payee computer program and the security server computer program may be accomplished in either a batch mode or in a continuous, real-time action.

Upon the first launch of the payee program, the payee program executes an initialization, or registration procedure. In this procedure, the payee computer program requires the payee to create and enter a payee, or access, password. This password is used on each subsequent launch of the payee program to verify and identify the payee and account or accounts being accessed. The payee computer system 130 then contacts the security server 140 over a computer network system, commonly known as the Internet 100. The payee program communicates with the security server program and registers the payee program with the security server program. This registration confirms the identity of the payee computer program.

During a first transaction session, after communications have been established between the security server 140 and the payee computer system 130, the security server 140 preferably obtains hardware specific information from the payee computer system 130 and stores it in both places to account for changes in the hardware configuration of the payee computer 130. Since hardware specific information is individual to each computer, it acts as a "finger print" that can be used to uniquely identify the computer. Additionally, this allows easy verification and identification of the specific computer during future transactions. The hardware specific information is encrypted and stored with the payee ID information in the security server database. By combining use of the payee password, the payee computer hardware information, and payee profile information, both the payee and the payee's computer program may be quickly, easily, and securely verified during future transactions.

When initiating communication with the security server system 140, the payee computer system 130 may use any well-known access protocol, e.g., Transmission Control Protocol/Internet Protocol ("TCP/IP"). A description of TCP/IP is provided in Information Sciences Institute, "Transmission Control Protocol DARPA Internet Program Protocol Specification (RFC 793)" (September 1981), and Information Sciences Institute, "Internet Protocol DARPA Internet Program Protocol Specification (RFC 791)" (September 1981). In this implementation, the payee computer system 130 acts as a client and the security server system 140 acts as a server. It should be noted that the communication may be initiated by the security server program to the payee program with the security server system 140 acting as the client and the payee computer system 130 acting as the server.

When initiating communication with the security server 140, the payee computer system 130 first sends a "payee request for connection" message to the security server system 140. The payee request for connection message may further include a variable length session identifier.

In response to the payee request for connection message, if the security server system 140 wishes to correspond with the payee computer system 130, it responds with a message to the payee computer system 130 to switch to a second, separate transaction port, thereby creating a second, or transaction, session. Another way of thinking about this is as a single session with two separate pathways: 1) a first port for initializing communications; and 2) a second port for transmission of transaction information. This is an important part of the present invention in that the identity of the second port is dynamically assigned and changes for each and every independently created session. This creates an extra element of variability to the transaction process that improves to the security of the transaction. If the security server system 140 does not wish to communicate with the payee computer system 130, it responds with a message indicating refusal to communicate.

FIG. 4 depicts the detailed steps of authorizing communications between the payee computer 130 and the security server 140, including the generating and transmitting of a payment authorization request.

Preferably, the security server connection message includes an initial very large prime number, a prime modulus, and a server calculated intermediate value. The payee computer system 130 replies to the security server connection message with a payee response message that preferably includes a payee calculated intermediate value. Separately, the payee computer system 120 calculates a final shared value. Once the security server 140 receives the payee calculated intermediate value, it too calculates the final shared value.

More specifically, the security server system 140 obtains a randomly generated server secret number. The security server 140 also selects a public prime number, which is preferably, a very large prime number residing in a pre-created prime number database, and a prime modulus. The security server 140 creates a server calculated intermediate value using the secret random number, the public prime number, and the prime modulus, by performing a portion of a selected algorithm. The security server 140 sends the server calculated intermediate value, the public prime number, and the prime modulus to the payee computer system 130. The payee computer system 130 generates a payee secret random number and uses the public prime number and prime modulus to create a payee calculated intermediate value. Additionally, the payee computer system 130 uses the server calculated intermediate value and the payee calculated intermediate value to calculate a shared final value. The payee computer system 130 sends the payee calculated intermediate value, along with selected payee ID information to the security server 140. In a preferred embodiment, the calculated intermediate values are encrypted before transmission. The security server 140 uses the payee calculated intermediate value, with the security server calculated intermediate value, to also calculate the same shared final value. Thus, the shared final value, which while known by both computers, is never transmitted. For this very reason, the shared final value cannot be intercepted by a third party for use in a fraudulent attempt on the account.

While other like algorithms with similar properties may be used, a preferred algorithm for the above security process is as follows:

SIV (security server intermediate value)=$g^{SRN}$ mod p, where g is the public prime number, mod p is the prime modulus, and SRN is the security server random number;

MIV (payee intermediate value)=$g^{MRN}$ mod p, where g is the public prime number, mod p is the prime modulus, and MRN is the payee random number; and SFV (shared final value)=$SIV^{MRN}$ mod p, for the payee computer 130, and =$MIV^{SRN}$ mod p, for the security server 140.

In creating the payee random number, a preferred embodiment has the payee computer system 130 using random values to seed the creation of a unique large random number. Preferably, these random numbers are obtained dynamically within the session, and even more preferably, are obtained from unique non-repeatable functions, such as mouse or cursor positions, line voltages, or the like.

In each separate system, the payee computer system 130 and the security server 140, the shared final value, in combination with selected portions of the payee profile information, is encrypted using yet another function, such as a one-way secure hash algorithm, to produce a final session key. This final session key, having portions that are generated dynamically within each session, and portions that are personal to each individual payee, is computationally impossible to decode or generate in the time allotted for each transaction, thereby providing an exceptionally high level of security for each transaction. The inclusion of a one-way function encryption of the data provides an ultra-high level of security for each transaction.

The security server 140 then takes the payee's profile information and compares to the payee profile information resident in the security server 140 in order to verify the payee. If the payee profile information is not verified, the connection is immediately terminated and logged to a failure database.

If the payee profile-information is verified during the transaction, the security server 140 proceeds to check several flags, or indicia fields, for an indication of whether further verification or encryption is required.

At this point both the payee computer system 130 and the security server system 140 have: 1) negotiated a communication session; 2) have communicated to each other the basis for the calculation of a set of encryption keys that may be used to encrypt and decrypt further communications between the two computer systems, 130 and 140 respectively; and 3) have calculated a final session key that is never transmitted and will be used for further encryption. The payee computer system 130 and the security server system 140 may thereafter engage in a secure financial transaction with a greatly reduced risk of interception or fraud by third parties.

If additional encryption is requested, the security server 140 uses the final session key and encrypts a verifying value. The verifying value is sent to the payee computer system 130. The payee computer system 130 decrypts the verifying value. The decrypted verifying value is then used in one of two different ways. First, it may be used as additional data added to the transaction information, re-encrypted and sent to the security server. Then, when the security server 140 decrypts the transaction it compares the verifying value before processing the transaction. Second, the decrypted verifying value may be used as an initial value to roll-over encrypt the transaction information, which is then further encrypted using the final session key and sent to the security server 140. The security server 140 then decrypts the message, and decrypts the roll-over encrypted transaction (using the verifying value). If the both systems use the same verifying value, the security server then has transaction information that is appropriate for the system, otherwise the decryption of the rolled-over information will yield strange characters and/or information. These two methods are typically selected by the software and may be dynamically chosen such that any individual transaction may use one or the other method.

Once the transaction has been verified and processed, the security server 140 creates a time stamp and sends it to the payee computer system 130 to finalize the transaction. In this way, the payee, not being in control of the time stamp, cannot create a false time record.

For the above payee-security server transaction, the payee computer system 130 generates a payee payment capture request and transmits it to the security server system 140. The security server 140 processes the payment capture request, generates a payment capture response and transmits it to the payee computer system 130. The payee computer system 130 processes payment capture response and verifies that payment for the goods or services purchased by the payor have been captured. The basic capture request is a data area that includes all the information needed by the security server system 140 to trigger a transfer of funds to the payee operating the payee computer system 130.

Specifically, a capture request includes, as a minimum amount of information, a capture request amount, a date, and a Payee ID (MID) for the particular payee.

The security server system 140 creates a basic capture response. The basic capture response is a data area that includes all the information to indicate whether a capture request was granted or denied.

A Virtual Point of Payment (vPOP) software is also described in accordance with a preferred embodiment using smart card technology or kiosk technology. The vPOP software provides payment functionality on independent platforms, allowing a payor to process payments securely using a smart card and the Internet 100. It provides full payment functionality for a variety of payment instruments.

A brief description of the vPOP software functions are provided below. The vPOP provides an interface for transactions that are initiated by the consumer. The consumer initiates a transaction from a Graphical User Interface (GUI) and all the transactions that are initiated by the consumer using a smart card and are routed through a remote computer or kiosk to the security server.

The payment functionality provided by the vPOP software is "Consumer-Initiated" at a site remote from the payee computer system 130. The normal flow of a transaction is via the vPOP software into a security server software that is responsible for converting into the appropriate format for additional processing and forwarding to existing host payment authorization systems.

Smart cards, according to the present invention has a cyclic registry that is used for transaction data storage. There are at least two separate registers in which at least two separate transactions may be stored. The actual number of registers is only limited by the available space in the memory of the smart card hardware. Additionally, each smart card must be registered to each individual at the financial institution, like a credit card, to prevent unauthorized access. This includes the use of a pin number or pass phrase to access the functionality of the smart card. Finally, the smart card may have encrypted verification information, such as portions of the above described payee profile information, which is used by the security server to securely identify the payor.

In use, the smart card is inserted into a kiosk computer having a modified version of the payee computer program running (the modification being the lack of a registry memory function). The payor is required to provide the smart card pin number or pass phrase. Once the payor correctly provides the smart card pin number or pass phrase, the transaction (check) screen is presented with transaction header information, which is encrypted and stored on the smart card, already filled in. The payor fills in the applicable fields and sends the transaction to the security server program using the same encryption and verification process as described above.

If the payor repeatedly provides an incorrect pin number or pass phrase, or if the security server program has the smart card flagged as missing or stolen, then the security server program sends a message to the kiosk computer to keep the smart card and not release it to the user. Alternately, the security server may send a message to the kiosk computer deactivating the smart card at the kiosk computer. In yet another embodiment, the security server periodically uploads to the kiosk computer a list of missing or stolen smart cards. In this embodiment, the kiosk computer reads the identification of the smart card upon insertion and, upon identification of the smart card as flagged, refuses to allow access to the kiosk program or transaction processing and may or may not keep the smart card. Additionally, the security server may communicate the time and location of the use of the stolen smart card to the proper authorities.

Host Payment Functionality: these transactions require communication with the security server 140, either immediately or at a later stage. For example, an Online Authorization-Only transaction, when initiated, communicates with the host immediately. However, an Off-line Authorization-Only transaction is locally authorized by the vPOP software without having to communicate with the host, but at a later stage this off-line authorization transaction is sent to the host. Within the Host Payment Functionality some transactions have an associated Payment Instrument, while others do not. These two kinds of transactions are:

Host Financial Payment Functionality: these transactions have a Payment Instrument (Smart card, Credit Card, Debit Card, E-Cash, E-Check, etc.) associated with them.

Host Administrative Payment Functionality: these transactions do not require a payment instrument, and provide either administrative or inquiry functionality. Examples of these transactions are "Reconcile" or the "Batch Close."

Local Functions and Transactions: these transactions do not require communication with the host at any stage, and provide essential vPOP software administrative functionality. An example of this is the vPOP software configuration function, which is required to set up the vPOP software. Another example is the "vPOP Batch Review" function, which is required to review the different transactions in the vPOP Batch or the Transaction Log.

A preferred embodiment of the vPOP software supports various Payment Instruments. A consumer chooses a payment based on personal preferences. Some of the Payment Instruments supported include credit cards, debit cards, electronic cash, electronic checks, and micro-payments (electronic coin).

As discussed above, the different Payment Functionality provided by the vPOP terminal require communication with the security server 140 and these transactions are referred to as "Online Transactions." The transactions that can be done locally without having to communicate are referred to as "Local Functions/Transactions." In order to provide support for many different types of Payment Instruments, the vPOP Payment Functionality have been categorized.

An authorization without capture transaction is used to validate the card holder's account number for a payment that needs to be performed at a later stage. The transaction does not confirm a payment's completion to the host, and there is no host data capture in this event. The vPOP captures this transaction record and later forwards it to the host to confirm the payment in a forced post transaction request.

A forced post transaction confirms to a host computer that a completion of a payment has been accomplished and requests data capture of the transaction. The forced post transaction is used as a follow-up transaction after doing an authorization (Online or Off-line) transaction.

The offline post transaction is identical to the "authorization without capture" transaction, except that the transaction is locally captured by the vPOP without initiating communication with a host. A forced post operation is done as a follow-up operation of this transaction.

The Internet 100 provides the communication processing necessary to enable the vPOP software. The software interface CGI communicates via the Internet 100 to provide information to the vPOP Security Server 140, which formats information in accordance with the vPOP.

As discussed above, in order to actually transact business over the Internet 100, the user must first register the smart card with the bank with which he signs an acquiring agreement. For online payment processing, the user must also create an appropriate set of digital credentials in the form of personal questions and possibly additional passwords, depending on the financial institution and/or user's desires.

The user, interacting with the software, can navigate to a list of security servers, and selects the bank to connect to by selecting from the list of banks.

Each vPOP may process a single transaction at a time. Security Servers 140 can process many transactions at a time, so transaction requests can often occur simultaneously at the security server 140. Thus, the security server 140 version of the vPOP Software must have support for multi-tasking and provide support for multiple threads to be active at the same time in the same system as well as the same process. This requirement is relatively straightforward.

Since the Internet 100 is so pervasive, and access is available from virtually any computer, utilizing the Internet 100 as the communication backbone for connecting the payor, payee and access to the authorizing bank through a security server 140 allows the payee vPOP software to be remotely located from the payee's premises. For example, the payor could pay for goods from any computer system attached to the Internet 100 at any location in the world. Similarly, the payee vPOP system could be located at a central host site where payee vPOP systems for various payees all resided on a single host with their separate access points to the Internet 100. The payee could utilize any other computer attached to the Internet 100 utilizing a protocol to query the remote vPOP system and obtain capture information, payment administration information, inventory control information, audit information and process payor satisfaction information. Thus, without having to incur the overhead of maintaining sufficient computer processing power to support the vPOP software, a payee can obtain the information necessary to run a business smoothly and avoid hiring IS personnel to maintain the vPOP system.

A novel feature of the vPOP software provides payment page customization based on a user's preferences. This feature automatically lists cards that are held by the user and accepted by particular payees based on the active terminal configuration. Each approved card for a particular payee provides smart card information supported by the payee.

Because the security server 140 must sustain reliable operations and enable graceful evolution, it is designed with some important attributes, including: security, availability, performance, scalability, and manageability.

Site redundancy and location redundancy allows the security server 140 to sustain service through virtually instantaneous recovery from internal failures or external disasters that cause physical damage to the system. Minimum-outage recovery is possible with redundant configurations of important components.

The security server 140 supports connections to a proprietary bank network and supports mirrored disk arrays.

The security server 140 architecture supports location redundancy where a secondary remote system is connected to the primary system via dedicated WAN links for software-driven database duplication.

The security server 140 software architecture, the choice of third-party software components, and the selection of hardware platforms enable the security server 140 to gracefully adapt and evolve to take on new demands in different dimensions.

The encryption and decryption algorithms used in processing the messages require significant computational power. A "security processor" is deployed with the security server 140 to boost the performance of cryptographic algorithms. The security processor is a networked peripheral device to the security server 140. It provides cryptographic services suitable for processing, and its services are accessible via calls to software libraries.

Security server 140 statistics about transaction requests (by transaction type) and transaction results (e.g., success, failed due to host, failed due to authentication, etc.) can be determined at any time for a particular time interval by generating a report.

A replay attack at the security server 140 is a request where either: a) the request is stale; the request was received "too late" with respect to the reqdate in the request (this window is specified by a configurable security server policy); b) the request is not stale but the exact Request/Response pair Id has already been seen before in a request and still logged in the security server 140 database.

If the vPOP times-out for any reason, it must retry later using a Request/Response Pair Id that indicates a new attempt. If the Gateway receives a late-response (after vPOP has given up) it simply logs it in the database for that retry attempt (if no retry attempt for the transaction is still outstanding at the host). There is a glare situation where the original response could arrive so late that it could be confused with the response from a currently outstanding retry attempt with the host. This situation is logged and the first response not sent back to vPOP.

Finally, the method and apparatus described above may be adapted to process transactions for medical records, prescriptions, audio-visual files, court documents, and any other sensitive or confidential information.

The preferred embodiment of the invention is described above in the Drawings and Description of Preferred Embodiments. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s). The foregoing description of a preferred embodiment and best mode of the invention known to the applicant at the time of filing the application has been presented and is intended for the purposes of illustration and description. It is not intended to be exhaustive or to limit the invention to the precise form disclosed, and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated.

What is claimed is:

1. A method for a secure transaction over a multi-computer network comprising the steps of:

a. providing at least two separate computer programs that are designed to communicate with each other over a multi-computer network, each separate computer program resident and runnable on a separate computer of the multi-computer network, at least one of the at least two separate computer programs further being a security server program for receiving and processing the secure transaction and at least one of the at least two separate computer programs further being a customer program;

b. running the security server program on a substantially continuous basis thereby making it available to receive secure transactions;

c. running the customer program on an as needed basis for communicating with the security server program with the customer program across a first communication port;

d. receiving a dynamically assigned port address from the security server program, further, receiving from the security server program a public set of numbers and a security server intermediate value that was calculated using at least the public set of numbers;

e. switching the customer program to the dynamically assigned port address for further communications with the security server program;

f. having the customer program calculate a customer intermediate value using at least the public set of numbers and a shared final value using at least the customer intermediate value and the security server intermediate value;

g. sending the customer intermediate value to the security server program;

h. having the security server program calculate the shared final value using the customer intermediate value and the security server intermediate value;

i. having both the security server program and the customer program create an encryption key using at least the shared final value;

j. having the customer computer encrypt transaction information using the encryption key;

k. sending the encrypted transaction information to the security server program;

l. having the security server program de-crypt the encrypted transaction information; and m. having the security server program process the transaction.

2. The method according to claim 1 wherein the public set of numbers is at least a public prime number and a prime modulus number.

3. The method according to claim 2 wherein the customer intermediate value is further calculated using a customer selected random number and the security server intermediate value is calculated using a security server selected random number.

4. The method according to claim 3 wherein the shared final value is calculated by the customer computer program using at least the security server intermediate value, the customer selected random number, and the prime modulus; and the shared final value is calculated by the security server program using at least the customer intermediate value, the security server selected random number, and the prime modulus.

5. The method according to claim 4 wherein the step of creating an encryption key using at least the shared final value comprises at least the step of passing at least a portion of the shared final value through a further encryption algorithm.

6. The method according to claim 5 wherein the further encryption algorithm is a one-way function.

7. The method according the claim 6 further including the step of having the customer computer program send customer profile information to the security server program for comparison with customer profile information previously stored on a computer memory accessibly by the security server program, thereby verifying the identity of the customer.

8. The method according the claim 1 further including the step of having the customer computer program send customer profile information to the security server program for comparison with customer profile information previously stored on a computer memory accessibly by the security server program, thereby verifying the identity of the customer.

9. The method according to claim 7 wherein the customer profile information comprises a pass phrase that may have white spaces and answers to customer created personal information questions.

10. The method according to claim 8 wherein the customer profile information comprises a pass phrase that may have white spaces and answers to customer created personal information questions.

\* \* \* \* \*